United States Patent [19]

Hartwig

[11] Patent Number: 4,639,645
[45] Date of Patent: Jan. 27, 1987

[54] DRIVE SYSTEM FOR A.C. MOTORS

[75] Inventor: Carl S. M. Hartwig, Taby, Sweden

[73] Assignee: Institut Cerac S. A., Ecublens VD, Switzerland

[21] Appl. No.: 753,497

[22] Filed: Jul. 10, 1985

[30] Foreign Application Priority Data

Aug. 1, 1984 [CH] Switzerland .................... 3710/84

[51] Int. Cl.$^4$ ............................................. H02P 7/74
[52] U.S. Cl. ........................................ 318/51; 318/53
[58] Field of Search .............. 318/51, 53, 105, 52, 318/107, 111, 112

[56] References Cited

U.S. PATENT DOCUMENTS 4,289,997 9/1981 Jung et al. ................... 318/51 X

FOREIGN PATENT DOCUMENTS

| 57-43593 | 3/1982 | Japan | 318/51 |
| 57-203102 | 12/1982 | Japan | 318/51 |
| 58-158708 | 9/1983 | Japan | 318/52 |
| 2089541 | 6/1982 | United Kingdom | 318/51 |

Primary Examiner—William M. Shoop, Jr.
Assistant Examiner—Bentsu Ro
Attorney, Agent, or Firm—Sughrue, Mion, Zinn, Macpeak & Seas

[57] ABSTRACT

A drive system for a group of brushless A.C. motors (15) which have mutually different working characteristics, for example mutually different voltages or frequencies, and which are arranged to be supplied with electric energy from a static converter (4). The system is characterized in that all motors (15) are arranged to be connected electrically, one at a time, to one and the same converter, and in that an identifying means (10, 13) which is individual to each motor is arranged to be connected to a control input (8, 9) on the converter in order to regulate the converter so that it generates electric energy with the necessary supply parameters to the motor. The invention also covers a hand-tool to be used in the system.

10 Claims, 4 Drawing Figures

DRIVE SYSTEM FOR A.C. MOTORS

The invention relates to a drive system for a group of at least two brushless A.C. motors having mutually different working characteristics, for example mutually different supply voltages or frequencies or mutally different maximum torque, and each of which is arranged to be supplied with electric energy with proper electrical supply parameters from a static converter. The invention further relates to a hand-tool to be used in the drive system.

A number of advantages are gained when driving A.C. motors, such as reversible motors, via a converter. With the aid of simple means, it is possible to control the converter so that, for example, the frequency of the output voltage is set within a broad frequency range, so as to drive the reversible motor connected to said converter at a desired speed in any selected one of the two possible directions of rotation, or, for example, so that at a given speed, the motor is only able to develop a given maximum torque. Static converters of the kind designed to control the drive of motors in, for example, working machines served by a multiplicity of motors, or to control the drive of various hand-tools situated in a working location, are relatively expensive. To date such tools have been put to relatively little use, since it has been necessary to assign a separate converter to each motor.

In many instances, such as in a workplace equipped with motor-driven multi-speed drills, motor-driven torque spanners etc., the workman is required to use the machines in a given sequence. Consequently, it is theoretically possible to use a single converter, which can be re-set by the workman to suit the tool to be used at that particular time, and the voltage thus being applied to the tool at a frequency which will cause the motor to work at a desired speed, or will deliver a maximum drive current to, for example, a nut or screw wrench. In practice, however, such a system will not function satisfactorily, among other things because of the relatively long time required to switch from one working stage to another, i.e. to change to another tool or machine having a working characteristic which differs from that of the preceding tool or machine, e.g. a different rotary speed. In addition hereto, there is a risk that the workman may forget to change the setting of the converter and thereby cause damage to the motors.

Consequently, a prime object of the invention is to provide a drive system for a group of motors of which at least two have mutually different working characteristics, i.e. require a change of, for example, supply voltage or frequency, in there is used a single regulatable static converter which when the converter output is connected to the tool the converter, is automatically adapted to the supply conditions required for the motor serving said tool. Another object is to provide a hand-tool to be used in the drive system.

These objects are achieved by means of the invention defined in the following claims and hereinafter described with reference to an embodiment thereof illustrated in the accompanying drawings, in which FIG. 1 is a simplified illustration of one embodiment of the invention;

Figure 1:
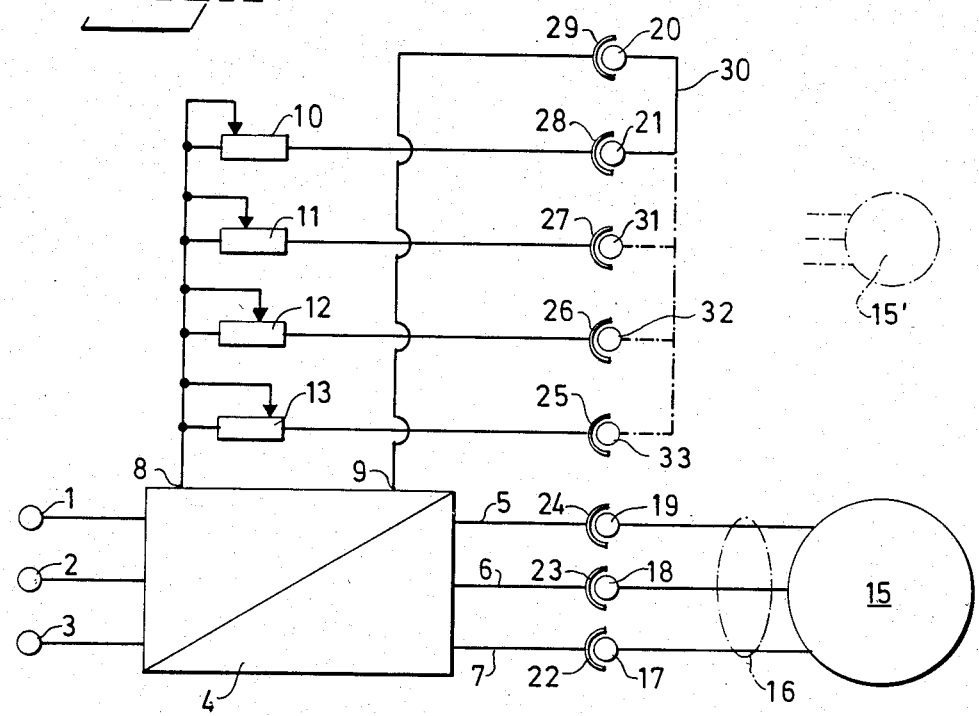

FIG. 1 illustrates in simple fashion a first embodiment of the invention, in which four different brushless A.C. motors having mutually different characteristics can be coupled, one after the other, to one and the same converter. The motors may be incorporated in separate hand-tools or machines, such as a drilling machine, a grinding machine, a torque wrench or the like, or for example in a machine in which the motors are arranged to operate in an ordered sequence, one after the other. In FIG. 1, the references 1, 2 and 3 identify the three-phase input of a regulatable converter 4, the three-phase output of which is identified by references 5, 6 and 7. The converter 4 is of a commercially available type, such as type AS 4000 manufactured by Emerson Electric Co., Santa Ana, Calif., USA, and is provided with a control input having terminals 8, 9. By applying a given control signal to the control input 8, 9, or by connecting a load thereto, it is possible either to, for example, change the converter frequency on the converter output, or to reverse the direction of rotation of the motor connected to the converter, or to change the value of a given maximum current, so as to change the maximum torque of the motor connected to said converter. In the embodiment illustrated in FIG. 1, the control input 8, 9 is connected to four potentiometers 10, 11, 12 and 13, each of which is set to a given fixed value and forms an identification means for respective motors. Only two motors are shown, one in full lines at 15 and the other in broken lines at 15'. Each of the potentiometers has a setting which corresponds to the desired working characteristic of its respective motor, such as rotary speed or maximum torque. The potentiometer is used to adjust the converter 1 in a manner to change the frequency of its output voltage, e.g. to change the frequency between the values 100 Hz, 120 Hz, 130 Hz and 300 Hz respectively, resulting in correspondingly different rotational speeds of the four connected motors. In the illustrated embodiment, each of the motors is connected by means of a cable 16 with its respective male connector. Each male connector has five connecting pins 17, 18, 19, 20 and one of the remaining illustrated pins 21, 31, 32, 33, depending on which of the motors is served by the male plug in question, as explained in more detail hereinafter. Each of the male connectors is arranged to be connectable to a female connector which is common to all the aforesaid male connectors and which is provided with connecting pins 22, 23, 24, 25, 26, 27, 28 and 29. The pins 22, 23, 24 and 29 are arranged to be brought into connection with corresponding pins 17, 18, 19 and 20 of a respective male connector each time a male connector is coupled to said female connector. The remaining pins 25, 26, 27 and 28 of the female connectors are arranged to co-act with an allotted respective pin 33, 32, 31 and 21 of a particular male connector and with a respective one of the potentiometers 10, 11, 12, 13, in dependence upon the motor to which the male connector coupled to the female connector at that time is assigned. Thus, in FIG. 1, the motor 15 is connected, via its cable 16, to a male connector which in addition to the four pins 17, 18, 19 and 20 also includes the pins 21, which is short-circuited with the pin 20 by means of a conductor 30. Thus, in this instance the pin 17 co-acts with the pin 22, the pin 18 with pin 23, the pin 19 with pin 24, the pin 21 with pin 28, the pin 28 co-acting with potentiometer 10, and the pin 20 with the pin 29. As just mentioned, the two pins 20 and 21 are short-circuited by means of the conductor 30 arranged in the male connector, and consequently the pins 21, 28, 20, 29, the conductor 30 and the potentiometer 10 form a control circuit across the control input 8, 9. This control circuit affects the converter 4 in a manner such that the output voltage of the output 5, 6, 7 obtains a frequency of 100 Hz, in accordance with the aforeselected example. As will be understood from the aforegoing, the male connector provided on the motor 15', which serves a further tool or machine, will also include the aforementioned pins 17, 18, 19 and 20, which co-act with pins 22, 23, 24 and 29 of the female connector. In addition hereto, the male connector will also include one of the three remaining pins 31, 32, 33 co-acting with respective pins 27, 26 and 25 of the female connector and thus with respective potentiometers 11, 12 or 13. Thus, presuming that the motor 15' is to operate at an output frequency of 130 Hz, the male connector of the motor 15' will include the connecting pin 31, which is cross-circuited with pin 20 by a conductor 30 (here shown in broken lines) so that when said motor is connected there is formed across the input 8. 9. It also includes a new control circuit comprising pin pairs 17, 22; 18, 23; 19, 24; 31, 27; and 20, 29; the conductor 30 and the potentiometer 11 co-acting with the pin 27 of the female connector, so as to produce an output frequency of 130 Hz.

Figure 2:
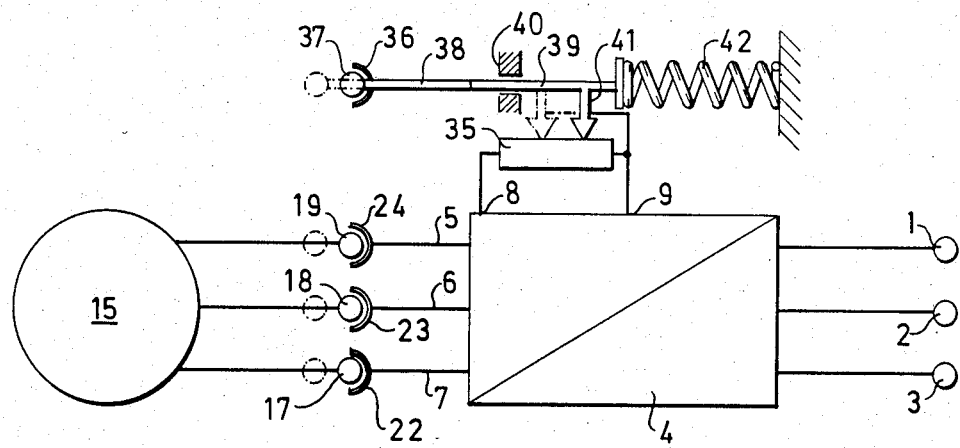
FIG. 2 illustrates a modified form of the embodiment of FIG. 1.

The embodiment illustrated in FIG. 2 is a modification of the FIG. 1 embodiment and incorporates but a single adjustable potentiometer 35 and a single indentification contact 36. In this embodiment, the male connector, here referenced 37, has an identification pin 38 having a length corresponding to a given setting value of the potentiometer 35, i.e. a length which is individual to the motor 15 connected to the system. The inner end of the identification pin 38 is arranged to co-act with a slide 39 mounted for axial movement in a bearing 40 and carrying a movable potentiometer-contact 41. The slide 39 is arranged to be moved into positive contact with the inner end of the identification pin 38 by means of a spring 42. As with the previously described embodiment, the potentiometer is connected to the control input 8, 9 of the converter 4.

Figure 3:
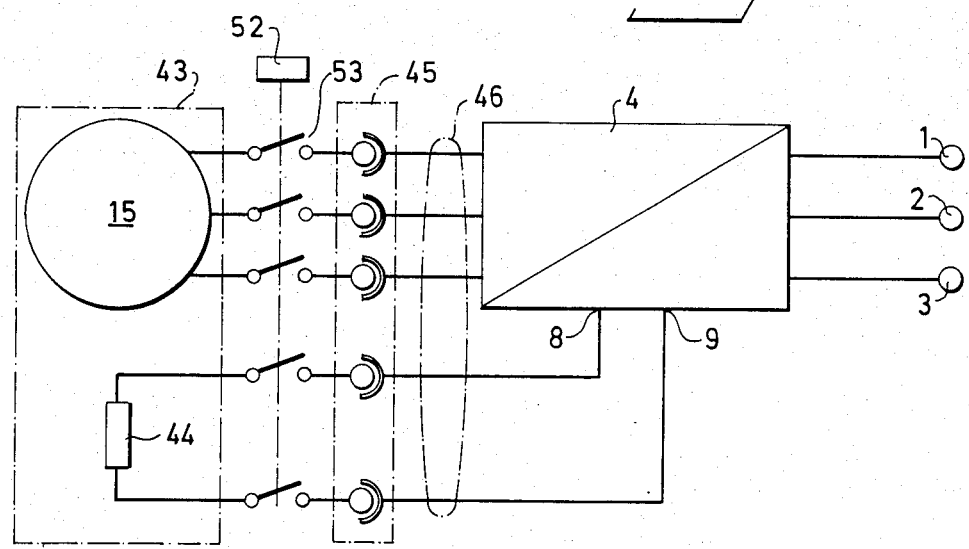
FIG. 3 illustrates a further modification of the embodiment of FIG. 1.

In the embodiments illustrated in FIGS. 1 and 2 the motor-identified member for respective connectable motors 15, i.e. the potentiometers 10, 11, 12, 13 and 35 have been shown to lie in connection with the converter 4, although it is also possible to place the identifying means within, for example, a hand-tool, as illustrated in FIG. 3. The hand-tool, for example a grinding machine, is imagined to lie within the frame 43 and each tool thus includes a resistance 44 which is connected across two pins in the connector plug 45 between the tool 43 and the converter 4. Plus 45 also provides a connection between resistance 44 and the control input 8, 9 of the converter 4 via a cable 46.

Hitherto, it has been assumed that the control circuit connected to the converter input determines, for example, the frequency of the output voltage or the maximum current. It will be understood, however, that the resistance 44 of the FIG. 3 embodiment may also be a temperature-sensing resistance, arranged to block the converter and therewith stop the motor should there be a risk of the motor 15 overheating.

Figure 4:
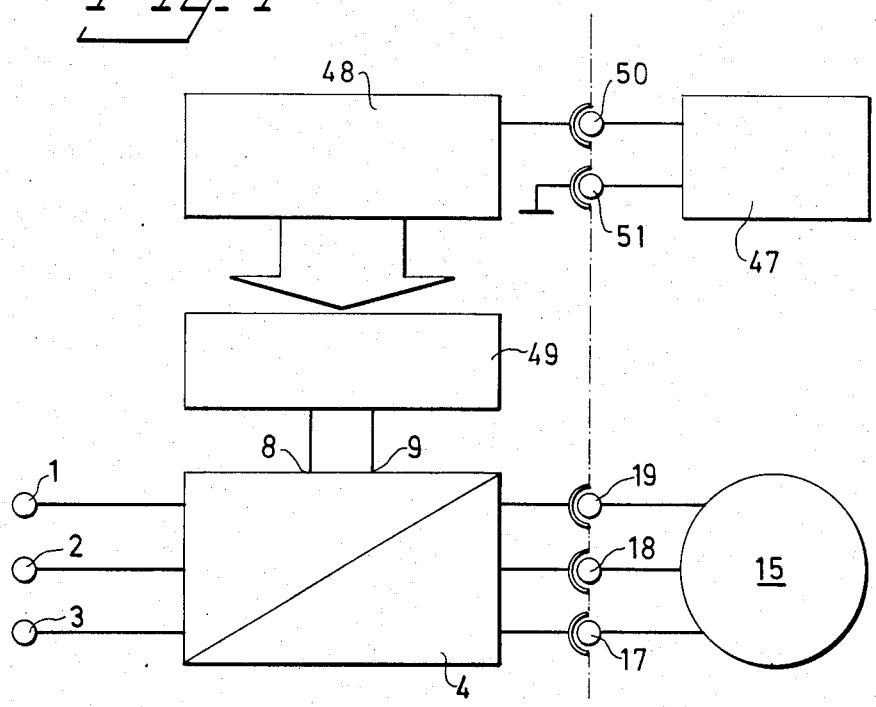
FIG. 4 illustrates a further embodiment of the invention.

FIG. 4 illustrates schematically a system according to the invention comprising an identification circuit 47 which includes certain characteristic control data for the converter 4. In this embodiment the motor 15 is also assumed to be incorporated in a hand-tool and the identifying circuit 47 is also incorporated in said hand-tool. The circuit 47 may comprise a static memory, ROM, which stores certain characteristic data for the hand-tool, such as the motor drive frequency, maximum tool temperature, rotational direction, maximum motor torque etc. The contents of the memory 47 are read by an electronic circuit 48, which transfers control data to a control circuit 49 connected to the input 8, 9 of the converter 4. A suitable converter in this respect is the microprocessor-based converter retailed by Emerson Electric Co., Santa Ana, Calif., USA under type reference AS 5100. As will be understood, the static memory 47 can be replaced with a microprocessor. Examples of suitable identifying means, in addition to those already mentioned, include capacitors, RC-circuits etc.

Since the identifying circuit 47, and also the resistance 44 of the FIG. 3 embodiment, are incorporated in the hand-tool, only two poles 50, 51, are required for transmitting the controlling data. In its simplest form the data in the identifying circuit 47 comprises a number which is characteristic of the machine in question and which, when received in the microprocessor 48, causes the individual controlling data-flow of the machine and the machine motor to be transmitted to the control circuit 49, and from there to the input 8, 9 of the converter 4.

In the aforegoing it has been assumed that when a particular hand-tool is to be used it is connected through a detachable electrical male/female connector. Alternatively, all tools used in a particular working location may be permanently connected to the converter in such case, while electrical connection is permanent, power is supplied only when the tool is to be used. Conventionally, the tool would be provided with a start button which closes an electrical contact and permits power to flow via the conductors. One such start button 52, which manouvers the aforesaid contacts, for example, the contact 53, is illustrated in FIG. 3.

I claim:
1. A machine drive system comprising:
at least two brushless AC motors (15) having mutually distinct working characteristics, each of said motors being adapted to be responsive to specific electrical input power having particular parameters;
a static converter means (4) having a common output (5, 6, 7) and a control input (8, 9), said converter means being adapted to be connected to said motors and to selectively provide from said common output said specific electrical input power having particular parameters;
circuit means connecting said motors, one at a time to said static converter means, said circuit means having an exclusive connection identification means (10-13; 35; 44; 47) for each motor,
said connection identification means being adapted to set said control input on said converter means whereby said converter means is adjusted to generate the specific electrical input power for the respective motor.

2. A drive system according to claim 1, characterized in that said connection identification means includes at least one electric element (10-13; 44; 47) which is characteristic for a respective motor, each said element being associated with either one of said motor and converter and being electrically connectable to the control input (8, 9) of the converter means when the motor (15) is electrically connected to said converter means (4).

3. A drive system according to claim 2, characterized in that said connection identification means comprises:
a memory circuit (47) disposed proximate to said motor, a microprocessor (48) associated with said control input (8, 9) in said converter means (4) for reading said memory circuit and for generating and transmitting control signals to said control input of said converter means.

4. A drive system according to claim 2, characterized in that said connection identification means (47) comprises a microprocessor (48).

5. A drive system according to claim 1, characterized in that the connection identification means comprises a mechanical actuator (38) associated with each said motor (15, 15′) and an adjustable electrical identifying circuit (35, 41) disposed on said converter means (4) arranged to be mechanically adjusted by said actuator in correspondence with the working characteristic of the motor (15) only when said motor (15) is electrically connected to the converter means (4).

6. A drive system according to claim 1, characterized in that each motor (15) is incorporated in a hand-tool and each said hand-tool incorporates said connection identification means.

7. A drive system as claimed in claim 1 wherein one of said motors is in a hand-tool, said hand-tool being adapted for unique identification by said connection identification means (10-13; 35; 44; 47) for actuating, in response to said hand-tool being electrically connected to said converter means (4), said control input (8, 9) on the converter means to regulate said converter means to generate the particular parameters necessary for the motor (15) and tool.

8. A drive system for a hand-tool according to claim 7, wherein said connection identification means comprise an identifying circuit (10-13; 35 44; 47) electrically connectable to said control input (8, 9).

9. A drive system for a hand-tool according to claim 8, wherein said connection identification means comprise a memory circuit (47).

10. A drive system for a hand-tool according to claim 7, wherein said connection identification means comprise a mechanical actuator (38) for mechanically actuating said control input (8, 9) so as to set said specific electrical input power.

* * * * *